Oct. 28, 1958 E. W. SEEGER 2,858,485
CONTROLS FOR MATERIAL HANDLING MAGNETS
Filed Oct. 23, 1953 2 Sheets-Sheet 1

Inventor
Edwin W. Seeger
By W. E. Lyon
Attorney

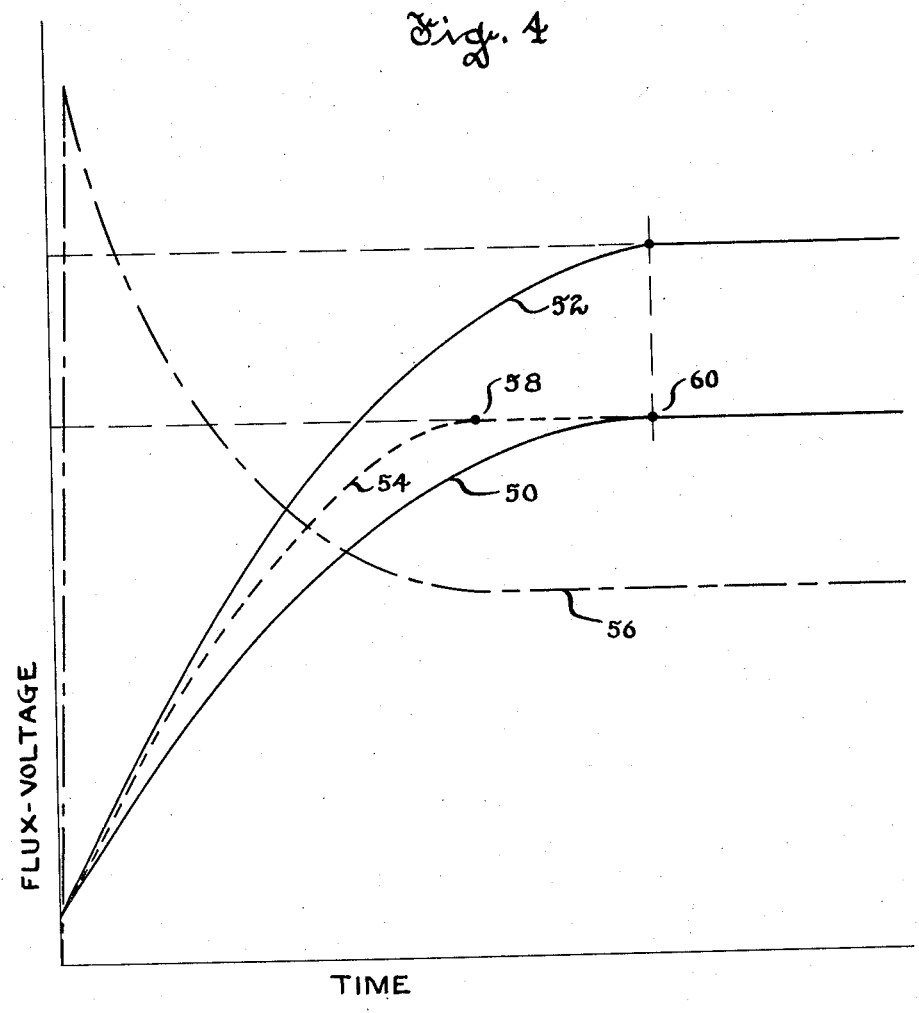

United States Patent Office 2,858,485
Patented Oct. 28, 1958

2,858,485

CONTROLS FOR MATERIAL HANDLING MAGNETS

Edwin W. Seeger, Wauwatosa, Wis., assignor to Cutler-Hammer, Inc., Milwaukee, Wis., a corporation of Delaware Application October 23, 1953, Serial No. 388,017

6 Claims. (Cl. 317—123)

This invention relates to controls for material handling magnets, and more particularly to means for producing a rapid build-up of magnetic flux in electromagnetic lifting magnets.

A primary object of the invention is to provide novel means for effecting a rapid build-up of magnetic flux in the magnet.

Another object is to provide magnet controls of improved character to initially impress the magnet coil with a high voltage and then to automatically effect reduction of said voltage to avoid overheating of and consequent damage to the winding.

A more specific object is to provide magnet controls which act automatically to effect a gradual reduction in the supply of energy to the magnet following initial energization of the latter.

A further object is to utilize the inductive effect of the magnet winding in controlling the rate at which the voltage impressed thereacross is reduced.

Other objects and advantages of the invention will become apparent from the following specification wherein reference is made to the drawings, in which Figure 1 is a wiring diagram of a material handling magnet control system embodying the present invention;

Fig. 4 is a graphic illustration of the operating characteristics of each of the control systems herein contemplated.

Figure 1:
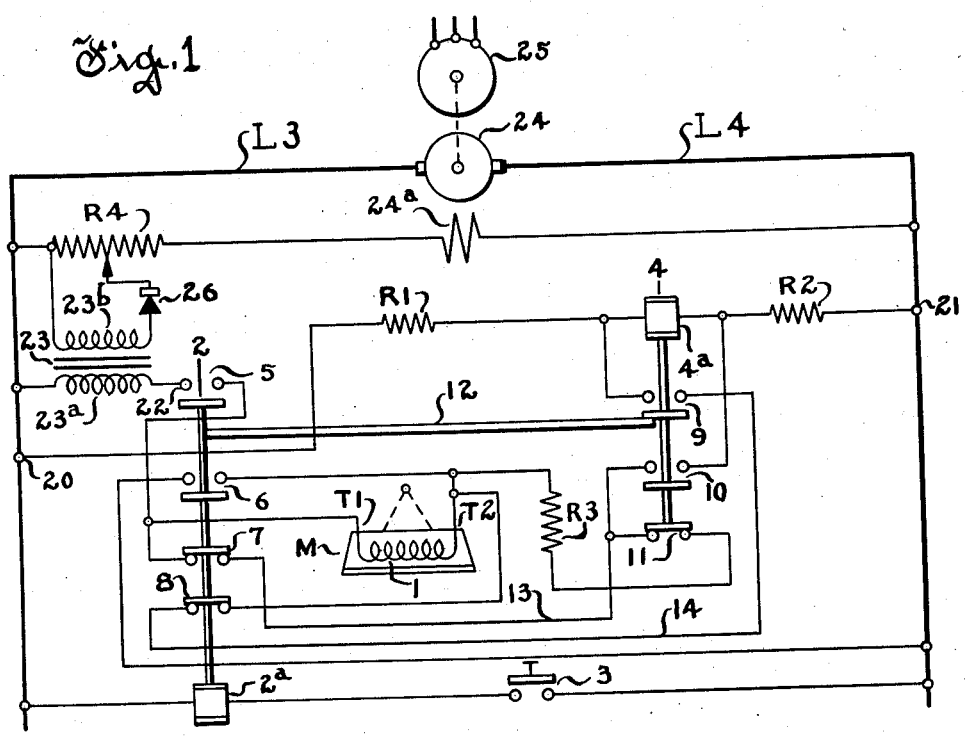

Like reference characters indicate corresponding parts throughout the several views of the drawings. Some of the features shown in these drawings have been described and claimed in patent application S. N. 156,800 for Controller for Inductive Devices, filed April 19, 1950 by Howard E. Hodgson and assigned to the assignee of the present application, now abandoned.

Referring to Fig. 1, M designates an inductive device in the form of a lifting magnet having an energizing winding 1 to be supplied with electric current from a direct current generator 24 through supply lines L3, L4. Generator 24 is driven at a constant speed by any suitable driving means such as motor 25. For purposes of effecting variations in the electrical output of generator 24, I employ a variably energizable generator field winding 24ª connected across lines L3 and L4 through an adjustable resistor R4. Resistor R4 is provided with an adjustable slide wire connected to one end of a secondary winding 23ᵇ of a transformer 23 through a rectifier 26. The other end of secondary winding 23ᵇ is connected to a point common to line L3 and one end of resistor R4.

The magnet energizing controller comprises an electroresponsive main switch 2 under the control of a master switch 3 and a second electroresponsive or "drop" switch 4 having a coil or winding 4ª connected to supply lines L3, L4 between the main or reverse current resistors R1, R2, respectively. Switch 2 is provided with normally open contacts 5 and 6 for connecting magnet winding 1 across supply lines L3, L4 during load lifting operations; and said switch is also provided with normally closed contacts 7 and 8 for establishing connection of the magnet winding 1 to one or the other of the discharge circuits as determined by the condition of switch 4 as will hereinafter be described.

Switch 4 is provided with normally open contacts 9 and 10 for connecting magnet winding 1 through the normally closed contacts 7 and 8 of switch 2 to the supply lines L3, L4 through resistors R1, R2 to afford discharge of the magnet winding 1 and establishment of reverse current therethrough for quick dropping of the load. Switch 4 is additionally provided with normally closed contacts 11 for establishing connection of magnet winding 1 through contacts 7 of switch 2 to an auxiliary discharge circuit including resistor R3.

The winding 4ª of switch 4 is of such strength as to be unable to lift switch 4 under the energization afforded by the connection of said winding across the supply lines L3, L4 through resistors R1, R2 as aforedescribed, but is of sufficient strength to seal and hold switch 4 if otherwise actuated to closed position. Accordingly, a mechanical interlock 12 between switches 2 and 4 is provided so that movement of switch 2 upon energization of its winding 2ª results in lifting of switch 4, but upon dropping out of switch 2, switch 4 will remain sealed under normal conditions, as will hereinafter appear. As will be obvious to those skilled in the art, in lieu of the mechanical interlock 12, switch 4 might be provided with an additional winding connected in series with winding 2ª of switch 2 to afford the described interlocking of switches 2 and 4.

The function and operation of the aforedescribed controller will now be more fully described. Motor 25 is energized to thereby drive generator 24 at a constant speed thus providing a voltage difference between supply lines L3 and L4. Field winding 24ª of generator 24 is energized by a circuit from line L3 through resistor R4, winding 24ª to line L4.

To energize the magnet for lifting, master switch 3 is moved to closed position, thus energizing switch 2 by a circuit extending from supply line L3 through winding 2ª and master switch 3 to supply line L4. Upon response of switch 2, energization of magnet winding 1 is established by a circuit extending from supply line L3 through primary winding 23ª of transformer 23, through contacts 5 of switch 2 to terminal T1 of the magnet winding, through said magnet winding to terminal T2 and thence through contacts 6 of switch 2 to supply line L4.

Due to the inductive nature of winding 1 the build-up of current flow to operating value is gradual thus causing a delay in time between closure of contacts 5 and 6 and current flow at operating value through winding 1. The build-up of magnetic flux in winding 1 is accordingly gradual and follows a curve on the order of curve 50 of Fig. 4. Since the build-up time is dependent upon the ratio of inductance to resistance and not upon the value of voltage supplied to the winding, it will be apparent that the current or magnetic flux build-up increases at a faster rate (see curve 52) when a higher voltage is impressed across winding 1. Therefore by initially impressing a high voltage across the winding and then gradually decreasing such voltage to a lower level which produces the desired operating value of magnetic flux, a more rapid flux build-up (curve 54) can be obtained in the magnet winding 1.

Thus, as the current flow increases in the aforementioned magnet energizing circuit, a voltage is impressed across secondary winding 23ᵇ of transformer 23. This voltage causes a current flow in the circuit comprising secondary winding 23b, rectifier 26 and a portion of resistor R4 as determined by the position of the slide wire on said resistor R4. Such current flow through resistor R4 creates a voltage which cancels a portion of the voltage initially impressed across said resistor R4 by operation of generator 24. Such cancellation increases the current flow through field winding 24a thus increasing the output of generator 24. Rectifier 26 prevents such a current flow through secondary winding 23b of transformer 23 as would effect a decrease in voltage output of generator 24. Since the rate of change of current flow through the energizing circuit of winding 1 is greatest immediately following closure of contacts 5 and 6, the voltage output of generator 24 is greatest immediately following such closure of said contacts. As the rate of change of current flow decreases the voltage output of generator 24 decreases as indicated by curves 54 and 56 in Fig. 4. Therefore the operating value of magnet current flow and magnetic flux is reached at point 58 (curve 54). Thus the build-up time is considerably shorter than normally required for reaching operating current flow as shown at point 60 (curve 50).

Response of switch 2 has meanwhile, through the mechanical interlock aforedescribed, lifted switch 4, and its coil 4a is sufficiently energized to seal and hold said switch in such position; i. e., with contacts 9 and 10 thereof closed, and contact 11 open.

To release the load carried by the lifting magnet, master switch 3 is moved to open position to interrupt the aforedescribed energizing circuit for switch 2. Switch 2 then drops out to interrupt the aforedescribed energizing circuit for magnet winding 1, and to close contacts 7 and 8 for connection of said winding 1 for discharge thereof. The circuit comprising transformer 23 is operative only during energization of winding 1. Thus the output of generator 24 is unaltered during establishment of either of the discharge circuits to be hereinafter described. Switch 4 meanwhile, under normal conditions, remains in its lifted position. Thus there is established a reverse current discharge circuit for magnet winding 1 from terminal T1 through contacts 7 of switch 2, conductor 13, through contacts 10 of switch 4 and thence through resistor R2 to supply line L4, and also from magnet terminal T2 through contacts 8 of switch 2, conductor 14, through contacts 9 of switch 4 and thence through resistor R1 to line L3. Coil 4a of switch 4 is at this time connected in the aforementioned reverse current discharge circuit in parallel with magnet winding 1.

Thus upon dropping out of switch 2, the line connections for the magnet are reversed and, as is well known, the induced voltage of the magnet winding will then oppose and exceed the voltage of the supply circuit, and the magnet winding will act to supply current to said supply circuit through resistors R1, R2. After a predetermined interval determined by the magnet and the value of discharge resistors R1 and R2, the discharge voltage of magnet winding 1 drops below the voltage of lines L3, L4 as supplied by generator 24, and current is then supplied from said supply lines to said magnet winding in reverse direction. The current now begins to build-up in the reverse direction and the terminal voltage at the magnet drops, and at a predetermined value allows switch 4 to drop out, such dropping out point being calculated to occur at about the time the flux in the magnetic circuit is reversed by the reverse current to demagnetize the load and drop it from the magnet. The reverse power connections are thus interrupted to prevent building-up of the flux in the reverse direction, and the magnet is completely disconnected from the source of supply.

If, on the other hand, at the time master switch 3 is opened to deenergize switch 2 as aforedescribed, either of the resistors R1 and R2 has failed, or the aforedescribed main discharge circuit is opened, switch 4 being de-energized will drop out along with switch 2 and contacts 11 of switch 4 will be closed. In that event an auxiliary discharge circuit for magnet winding 1 will be afforded from terminal T1 through contacts 7 of switch 2, conductor 13, through contacts 11 of switch 4, and thence through auxiliary discharge resistor R3 to terminal T2 of the magnet.

Figure 2:
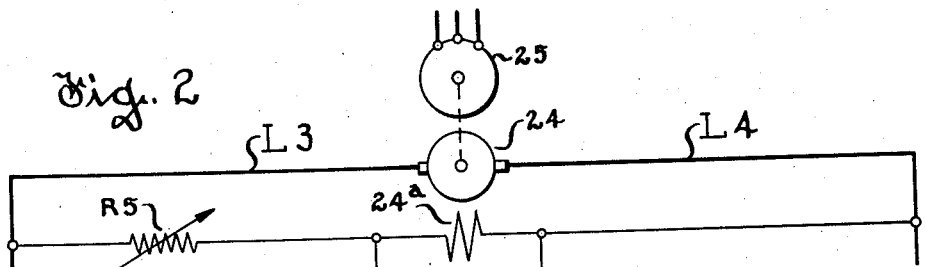
Fig. 2 is a wiring diagram of a modification of a portion of the control system shown in Fig. 1.
Figure 3:
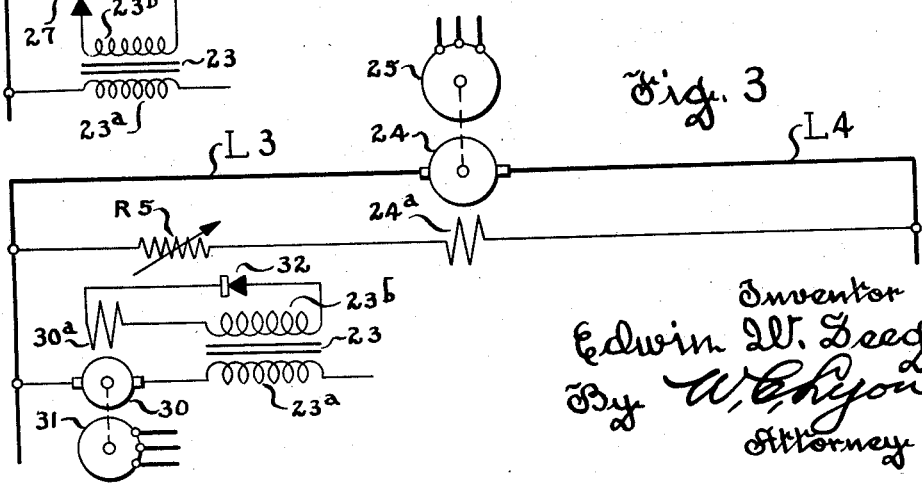
Fig. 3 is a wiring diagram of another modification of a portion of the control system shown in Fig. 1.

Figs. 2 and 3 each show a modified form of the control circuit of Fig. 1. Since the electromagnetic control relays and their connections to the various circuit components would be the same as shown in Fig. 1 such components and circuitry are not shown; it being obvious that anyone skilled in the art can readily substitute the modifications of Figs. 2 and 3 for the generator 24 and its control components as shown in Fig. 1. Such substitutions can be made by opening the circuits of Fig. 1 at points 20, 21 and 22 and connecting the desired modification into the relay circuits at those same points. Each of the modifications of Figs. 2 and 3 provides a flux build-up in the magnet winding which follows curve 54 of Fig. 4.

Fig. 2 shows the secondary winding 23b of transformer 23 connected directly across the generator field winding 24a. With such an arrangement the current flow through winding 24a due to the voltage impressed across secondary winding 23b will aid the current flowing through the series circuit consisting of resistor R5 and field winding 24a. Such positive feed-back creates the voltage curve 56 of Fig. 4. Rectifier 27 of Fig. 2 serves the same purpose as does rectifier 26 of Fig. 1.

Fig. 3 shows an auxiliary generator 30 having a separately energizable field winding 30a, and driven by any suitable driving means such as motor 31. Generator 30 and its field winding 30a are connected in circuit with generator 24 to aid the same in effecting energization of magnet winding 1. When there is a change in the rate of current flow through the magnet energizing circuit, a voltage is impressed across secondary winding 23b of transformer 23, thus causing a current flow through field winding 30a of generator 30. In this manner, generator 30 provides a current flow through winding 1 in addition to the current flow produced by generator 24. The modification shown in Fig. 3 produces voltage variations as indicated by curve 56 of Fig. 4, and also magnetic flux variations as shown by curve 54. Rectifier 32 performs the same function as rectifiers 26 and 27 of Figs. 1 and 2, respectively.

Although I have shown and described certain embodiments of my invention, I am fully aware that other modifications thereof are possible. My invention, therefore, is not to be restricted except as necessitated by the prior art and by the scope of the appended claims.

What is claimed is:

1. In combination, a lifting magnet having an inductive energizing winding, means providing a source of variable voltage power supply, means connecting said winding to said source, and control means for the first mentioned means including means in circuit with said winding and acting in accordance with the inductive effect of said winding to initially cause said first mentioned means to supply power to said winding at one voltage and thereafter automatically gradually reduce the voltage.

2. The combination according to claim 1 wherein the included means of said control means comprise a transformer having a primary winding in circuit with said winding and a secondary winding in circuit with said first mentioned means.

3. The combination according to claim 1 wherein said first mentioned means comprises a generator having a shunt field winding and wherein said control means comprises a transformer having a primary winding in circuit with the energizing winding of said magnet and a secondary winding in circuit with the generator shunt field winding.

4. The combination according to claim 3 together with an adjustable resistor in series with the generator shunt field winding and wherein the secondary winding is connected in circuit between one end of said resistor and an intermediate point on the latter.

5. The combination according to claim 3 wherein said secondary winding is connected in parallel across the generator shunt field winding.

6. In combination, a lifting magnet having an inductive energizing winding, first and second generators having their armatures in circuit with said energizing winding to subject the latter to the resultant of their output voltages, said second generator having a shunt field winding, a transformer having its primary winding in circuit with said energizing winding and having a secondary winding in circuit with said shunt field winding of said second generator to control the voltage output of the latter as a function of change in inductive effect of said magnet energizing winding to subject the latter initially to a given voltage and thereafter effect a gradual reduction thereof to a lower value.

References Cited in the file of this patent
UNITED STATES PATENTS

| | | |
|---|---|---|
| 782,340 | Hubbard | Feb. 14, 1905 |
| 895,965 | Clinker | Aug. 11, 1908 |
| 1,420,761 | Schan | June 27, 1922 |
| 1,527,641 | Gilt | Feb. 24, 1925 |
| 1,778,973 | Frickey | Oct. 21, 1930 |
| 2,038,186 | McNeil | Apr. 21, 1936 |
| 2,257,361 | Yorkey | Sept. 30, 1941 |